United States Patent [19]

Kawata

[11] 4,452,424

[45] Jun. 5, 1984

[54] ELECTROMAGNETIC LINEAR CONTROL VALVE

[75] Inventor: Shoji Kawata, Okazaki, Japan

[73] Assignee: Aisin Seiki Kabushiki Kaisha, Kariya, Japan

[21] Appl. No.: 469,692

[22] Filed: Feb. 25, 1983

Related U.S. Application Data

[63] Continuation of Ser. No. 110,552, Jan. 8, 1980, abandoned.

[30] Foreign Application Priority Data

Jan. 19, 1979 [JP] Japan .................................. 54-5226

[51] Int. Cl.³ ............................................. F16K 31/06
[52] U.S. Cl. ................................. 251/129; 137/625.33; 335/262
[58] Field of Search ................ 251/129, 141; 335/255, 335/262

[56] References Cited

U.S. PATENT DOCUMENTS

| | | | |
|---|---|---|---|
| 3,625,477 | 12/1971 | Vogel | 251/141 X |
| 3,712,581 | 1/1973 | Parlow | |
| 3,788,597 | 1/1974 | Ichioka | 251/129 |
| 3,791,408 | 2/1974 | Saitou et al. | 251/129 |
| 3,945,399 | 3/1976 | Tirelli | 251/129 |
| 3,967,648 | 7/1976 | Tirelli | 251/129 |

*Primary Examiner*—Arnold Rosenthal

*Attorney, Agent, or Firm*—Oblon, Fisher, Spivak, McClelland & Maier

[57] ABSTRACT

An electromagnetic linear control valve including a housing having inlet and outlet ports, a valve mechanism disposed within the housing for controlling the quantity of fluid flow from the inlet port to the outlet port, an electric control circuit and a linear motor associated with the valve mechanism for operating the valve mechanism in response to an input current from the electric control circuit wherein the valve mechanism includes a valve seat member positioned between the inlet and outlet ports and having an elongated opening formed therein to permit flow of fluid therethrough and a valve member cooperating with the valve seat member to control the opening area of the valve seat member and wherein the linear motor includes a bobbin, a solenoid wound on the bobbin and connected to the electric control circuit, a yoke member of magnetic material extending into an inner peripheral portion of the bobbin and supported on the bobbin, a core of magnetic material movably mounted on the yoke member along the axial direction thereof and operatively connected with the valve member so as to form a gap for providing a magnetic path of the solenoid in the radial direction of movement of the core between an inner peripheral portion of the yoke and an outer peripheral portion of the core and a spring mechanism biasing the core in an axial direction.

2 Claims, 1 Drawing Figure

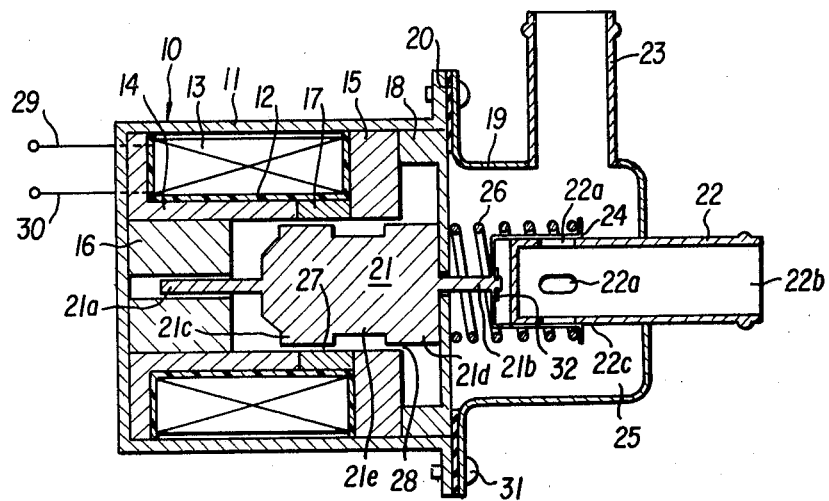

ELECTROMAGNETIC LINEAR CONTROL VALVE

This is a continuation of application Ser. No. 110,552, filed Jan. 8, 1980 and now abandoned.

BACKGROUND OF THE INVENTION

1. Field of the Invention

The present invention relates to an electromagnetic linear control valve and more particularly to an improvement in electromagnetic linear control valves in which the moving core without a wound solenoid moves linearly and controls the opening of the valve in accordance with variation of the applied current of the solenoid by electromagnetic induction.

2. Description of the Prior Art

A conventional electromagnetic valve is disclosed, for example, in U.S. Pat. No. 3,712,581 granted on Jan. 23, 1973 to Parlow. In such conventional electromagnetic valve, the magnetic path of the moving core includes a gap which is positioned in the moving direction of the moving core, and the moving core is operatively connected to a valve element.

Consequently, it is difficult to linearly control the opening of the valve in accordance with variation of current applied to the solenoid because the gap is changed by the moved position of the moving core, and the torque of the moving core by the electromagnetic induction is inversely proportional to the square of the dimension of the gap.

SUMMARY OF THE INVENTION

One object of the present invention is to provide an electromagnetic linear control valve which overcomes the disadvantages in conventional electromagnetic valves.

Another object of the present invention is to provide an improved electromagnetic linear control valve which is low in cost and simple in construction.

According to the invention, the gap of the magnetic path of the columnar moving core is determined along the radial direction of the moving core and, therefore, the dimension of the gap of the magnetic path is constant at any position the moving core is moved to thereby allowing for a constant torque of the moving core in any position the moving core is moved to.

BRIEF DESCRIPTION OF THE DRAWINGS

Various objects, features and attendant advantages of the present invention will be understood when considered in connection with the the accompanying drawings, wherein:

The sole FIGURE is a perspective view of one embodiment of an electromagnetic linear control valve in accordance with the present invention.

DETAILED DESCRIPTION OF THE PREFERRED EMBODIMENT

In the sole FIGURE is illustrated an electromagnetic linear control valve 10 in accordance with the present invention in which a linear motor is adapted to operate a flow regulating valve.

A bobbin 12 of magnetic material, a solenoid 13 wound on the bobbin 12, a first yoke 14 of magnetic material extending into an inner peripheral portion of bobbin 12, a second yoke 15 of magnetic material, a bearing 16 of non-magnetic material inserted in the inner peripheral portion of first yoke 14, a non-magnetic blow-out ring 17 formed of non-magnetic material is positioned at an inner peripheral portion between the yoke 14 and the second yoke 15, and a bearing 18 of non-magnetic material are disposed in case or having 11 of magnetic material which has a open portion at one end thereof. Case 11 is hermetically secured to cover 19 of non-magnetic material through gasket 20 by screws 31. Consequently, members 12, 13, 14, 15, 16, 17 and 18 are held against case 11.

A columnar moving core 21 of magnetic material having thin axles or projections 21a and 21b at both ends thereof is positioned within case 11 and includes large diameter portions 21c and 21d and a small diameter portion 21e disposed between portion 21c and portion 21d. The moving core 21 is slidably mounted in the axial direction thereof against case 11 by bearings 16 and 18 and gap 27 of the magnetic path of moving core 21 in a radial direction between the inner peripheral portion of yoke 14 and outer peripheral portion of larger diameter portion 21c.

Another gap 28 of the magnetic path of moving core 21 is formed in the radial direction between inner peripheral portion of second yoke 15 and outer peripheral portion of large diameter portion 21d of moving core 21. The dimensions or distances of each gap 27 and 28 is thus constant even if moving core 21 is moved along the axial direction thereof. In each gap 27 and 28, the radial area of large diameter portion 21c confronting the first yoke 14 is equal to the radial area of large diameter portion 21d confronting second yoke 15 in any axial position the moving core 21 is moved to. Cover 19 is provided with nipple 22 which is secured to the side wall thereof. Nipple 22 is formed with inlet port 22b and tubular valve seat portion 22c with a closed end portion.

Valve seat portion 22c is provided with a plurality of axial slots 22a opening into interior chamber 25. Cover 19 is also provided with outlet port 23 which is in communication with inlet port 22b through interior chamber 25 and axial slots 22a of nipple 22. Cup-shaped slide valve member 24 is slidable on valve seat portion 22c and is connected to the thin axle or projection 21b of moving core 21 by a C-shaped ring 32.

Compression coil spring 26 is disposed between bearing 18 and an annular flange of valve member 24 so as to bias valve member 24 in a rightward direction. Thus, axial slots 22a of valve seat 22c are normally closed when solenoid 13 is de-energized by slide valve member 24 due to the biasing force of spring 26. Solenoid 13 has lead wires 29 and 30 which are connected to receive a control current from an electric control circuit (not shown).

In operation of the electromagnetic linear control valve 10, when solenoid 13 is in a de-energized condition, spring 26 is in the extended position shown in the sole FIGURE whereby valve member 24 is biased closed over slots 22a. Upon solenoid 13 receiving a control current, solenoid 13 is excited and the magnetic path constitutes a magnetic flux circuit which includes solenoid 13, case 11, second yoke 15, gap 28, large diameter portion 21d, moving core 21, large diameter portion 21c, gap 27, first yoke 14, case 11 and solenoid 13. Moving core 21 moves axially in a leftward direction in the sole FIGURE against the biasing force of spring 26 to open axial slots 22a until it reaches the position in which the magnetic force of moving core 21 is balanced with the biasing force of spring 26.

In the range of reciprocating movement of moving core 21, the dimensions or distances of gap 27 and 28 are constant to thereby allow the torque of moving core 21 to remain constant in any position which moving core 21 is moved. Consequently, moving core 21 is movable to a position in accordance with the applied current of solenoid 13 such that valve member 24 is moved therewith. This permits flow of fluid from inlet port 22b to outlet port 23 and, thus, the quantity of fluid flow is linearly controlled by movement of valve member 24, which movement is proportional to the applied current in solenoid 13. It is, therefore, evident that the effective opening area of axial slots 22a is linearly controlled in accordance with variation of control current in solenoid 13.

It can thus be appreciated that moving core 21 in the illustrated embodiment of the present invention allows for gaps 27 and 28 of the magnetic path passing therethrough to cause the magnetic force to thereby be easily movable in accordance with the applied current of solenoid 13, which is mounted on bearing 16 of non-magnetic material and bearing 18 of non-magnetic material at each end thereof, for preventing leakage of flux in the axial direction thereof and preventing the magnetic flux from passing through the same in the radial direction thereof.

Obviously, many modifications and variations of the present invention are possible in light of the above teachings. It is therefore to be understood that within the scope of the appended claims the invention may be practiced otherwise than as specifically described hereinabove.

What is claimed as new and desired to be secured by Letters Patent of the United States of America is:

1. An electromagnetic linear control valve comprising:
   a housing having inlet and outlet ports;
   valve means disposed within said housing for controlling the quantity of fluid flow from said inlet port to said outlet port; and
   a linear motor associated with said valve means for operating said valve means in response to an input current from an electric control circuit, wherein said valve means further comprises:
   a valve seat member positioned between said inlet and outlet ports and having an elongated opening formed therein to permit flow of fluid therethrough, and
   a valve member cooperating with said valve seat member to control an opening area of said valve seat member, and wherein said linear motor comprises:
   a bobbin and a solenoid wound on said bobbin and connected to said electric control circuit;
   yoke means of magnetic material including a first yoke extending into an inner peripheral portion of said bobbin and supported on said bobbin;
   a core of magnetic material movably mounted on first and second spaced-apart bearing members of non-magnetic material mounted in said housing and disposed only at each axial end of said core along the axial direction thereof and operatively connected with said valve means so as to form a gap for providing a magnetic path of said solenoid in the radial direction of movement of said core between an inner peripheral portion of said yoke means and an outer peripheral portion of said core;
   said core further comprising first and second large diameter portions each having outer peripheral surface portions and a small diameter portion disposed therebetween such that said outer peripheral surface portions of said large diameter portions and an inner peripheral portion of said yoke means form said gap for providing a magnetic path between said core and said yoke means wherein said yoke means and said first and second large diameter portions of said core overlap in equal amounts such that the amount of said overlap changes in response to the axial displacement of said core;
   spring means biasing said core in an axial direction; and
   said yoke means further comprising a second yoke, said first yoke and said second yoke being separately positioned in said axial direction.

2. An electromagnetic linear control valve comprising:
   a housing having inlet and outlet ports;
   valve means disposed within said housing for controlling the quantity of fluid flow from said inlet port to said outlet port; and
   a linear motor associated with said valve means for operating said valve means in response to an input current from an electric control circuit, wherein said valve means comprises:
   a valve seat member positioned between said inlet and outlet ports and having an elongated opening formed therein to permit flow of fluid therethrough, and
   a valve member cooperating with said valve seat member to control opening area of said valve seat member, and wherein said linear motor comprises:
   a bobbin;
   a solenoid wound on said bobbin and connected to said electric control circuit;
   yoke means of magnetic material including a first yoke extending into an inner peripheral portion of said bobbin and supported on said bobbin;
   a core of magnetic material movably mounted on first and second spaced-apart bearing members of non-magnetic material mounted in said housing and disposed only at each axial end of said core along the axial direction thereof and operatively connected with said valve so as to form a gap for providing a magnetic path of said solenoid in the radial direction of movement of said core between an inner peripheral portion of said yoke means and an outer peripheral portion of said core;
   said core further comprising first and second large diameter portions each having outer peripheral surface portions and a small diameter portion disposed therebetween such that said outer peripheral surface portions of said large diameter portions and an inner peripheral portion of said yoke means form said gap for providing a magnetic path between said core and said yoke means wherein said yoke means and said first and second large diameter portions of said core overlap in equal amounts such that the amount of said overlap changes in response to the axial displacement of said core;
   spring means biasing said core in an axial direction;
   said yoke means further comprising a second yoke, said first yoke and said second yoke being separately positioned in said axial direction, and
   a non-magnetic ring disposed between an inner peripheral portion of said first yoke and an inner peripheral portion of said second yoke and asymmetrically disposed with respect to the axial midpoint of said solenoid and juxtaposed an end portion of said solenoid adjacent said second yoke.

* * * * *